United States Patent
Bonne

[11] Patent Number: 5,220,830
[45] Date of Patent: Jun. 22, 1993

[54] COMPACT GAS FLOW METER USING ELECTRONIC MICROSENSORS

[75] Inventor: Ulrich Bonne, Hopkins, Minn.

[73] Assignee: Honeywell Inc., Minneapolis, Minn.

[21] Appl. No.: 727,416

[22] Filed: Jul. 9, 1991

[51] Int. Cl.$^5$ .................................................. G01F 1/68
[52] U.S. Cl. .................................. 73/204.21; 73/198; 73/204.26
[58] Field of Search ............................ 55/97, 308, 350; 73/204.21, 204.22, 204.26, 118.2, 198

[56] References Cited

U.S. PATENT DOCUMENTS

| | | | |
|---|---|---|---|
| 1,130,596 | 3/1915 | Herbing | 55/350 |
| 2,859,617 | 11/1958 | Adams | 73/204.22 X |
| 3,251,225 | 5/1966 | Luft | 73/204.22 X |
| 3,433,069 | 3/1969 | Trageser | 73/204.21 |
| 5,014,552 | 5/1991 | Kamiunten et al. | 73/204.21 |
| 5,029,465 | 7/1991 | Tanimura et al. | 73/118.2 |
| 5,081,866 | 1/1992 | Ochiai et al. | 73/204.21 |

*Primary Examiner*—Herbert Goldstein
*Attorney, Agent, or Firm*—Michael B. Atlass; Charles G. Mersereau

[57] ABSTRACT

A compact dual microanemometer-based flow meter for a gaseous fluid includes a dynamic microanemometer flow sensor located in a measuring nozzle of reduced diameter directly exposed to the main fluid flow stream and a static microanemometer sensor located so as to be in communication with the main flow stream but not in direct contact with the main flow stream. Particulate matter is excluded by a particulate trapping system located upstream of the flow sensors and has a plurality of sequentially encountered particulate traps including dead-end trap and settling traps and a honeycomb laminarizing device is positioned in the stream between the particulate trapping system and the microanemometers.

15 Claims, 2 Drawing Sheets

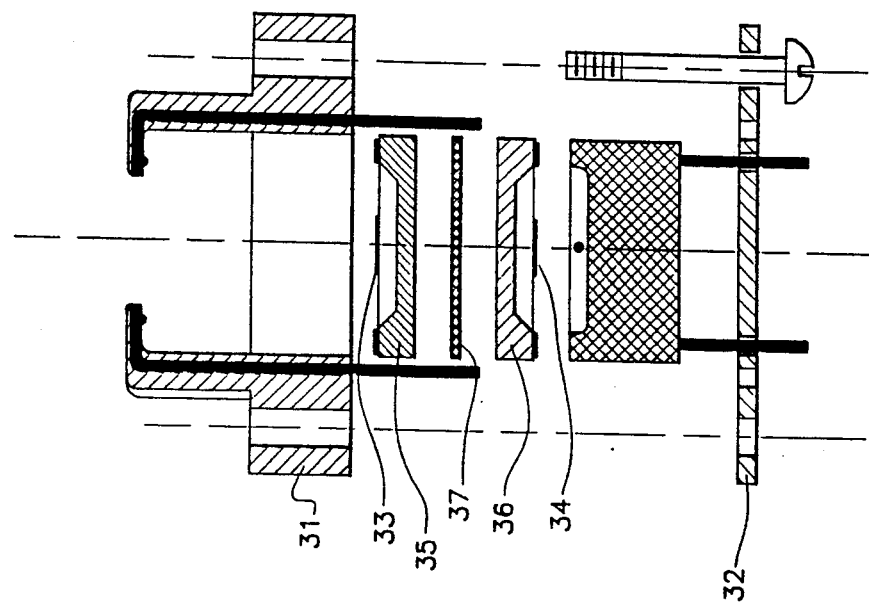
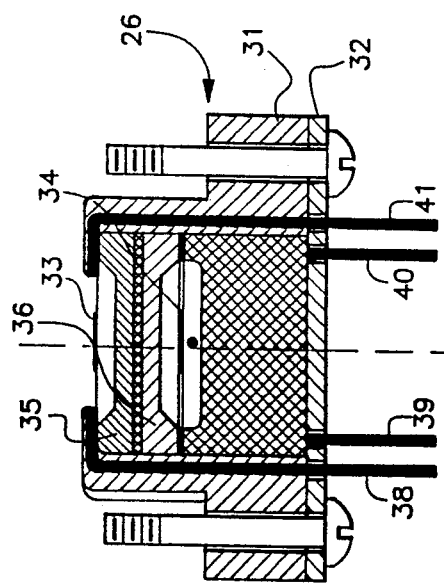
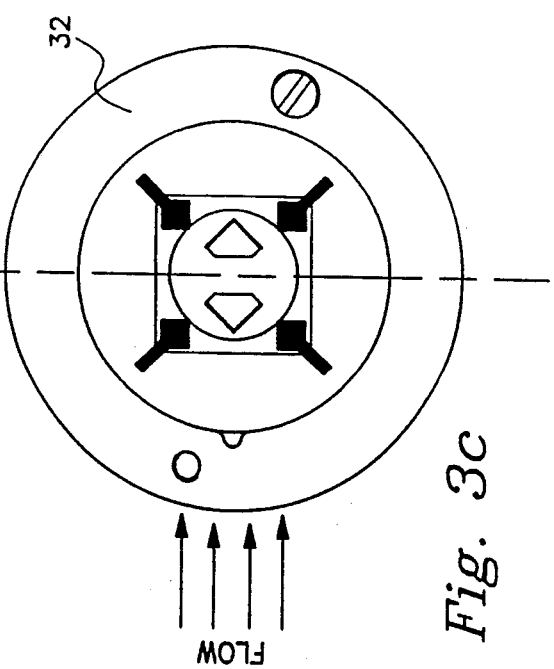

ued States Patent...

COMPACT GAS FLOW METER USING ELECTRONIC MICROSENSORS

CROSS REFERENCE TO RELATED APPLICATION

Cross reference is made to co-pending application Ser. No. 07/727,415 filed of even date and assigned to the same assignee as the present application.

BACKGROUND OF THE INVENTION

FIELD OF THE INVENTION

The present invention relates to the flow measurement of gaseous fluids using electronic hot film microsensors and, more particularly, addresses the problems associated with retaining maximum microsensor sensitivity while avoiding microsensor damage due to debris and particulate matter carried by the flowing stream of interest. The system further avoids clogging and provides a minimum pressure drop for the achieved sensitivity to flow. The invention eliminates noise errors normally associated with fluid flow measuring devices occasioned by turbulent flow in the fluid of interest or in the placement of the fluid sensor with respect to proximate upstream and downstream interfering pipe fittings such as valves, elbows and the like utilized in the distribution system.

RELATED ART

Hot film microanemometer packages for general use are known for both uni- and bi-directional flow applications. An example of such a device is illustrated and described in U.S. Pat. No. 4,501,144 to Higashi, et al. The microanemometers or "microbridges" themselves are quite inexpensive to produce. The small size and relatively fragile undercut suspended bridges of the sensors, however, are vulnerable to damage from particulate matter and debris carried in the fluid stream. For that reason, packages containing devices of the class described have had to be constructed to be protective of the sensing elements. Because applications vary, they have been designed for any possible adverse condition or placement, i.e., for the "worst case". This requirement has tended to make the packages very high cost items.

The devices, like conventional orifice meters, for example, further have had severe use limitations with respect to placement in distribution networks of fluids to be metered. For example, most of the known packages are not designed to prevent or address the problem of flow transitions from laminar to turbulent flow within the required flow range. This leads to serious calibration and readout errors or severely limits use of the device. Also, these devices normally do not address the problems of minimizing pressure drop or permanent pressure loss in the conduit of the measured flow to thereby minimize aberrations in the fluid distribution network caused by metering.

Large particles (generally $\geq 200$ microns in size) and debris need to be eliminated from the gas flow to be sensed by such a microbridge-type flow meter sensor, and the flow needs to be reasonably laminar to minimize the noise amplitude of turbulence in order to make use of the high degree of sensitivity characterized by these devices. Prior solutions to the problems of debris involved the use of a bypass or the insertion of fine screens to eliminate particulate matter. However, these solutions themselves caused a loss of sensitivity in the case of the bypass technique or clogging problems with respect to the fine mesh screens which, in turn, also produced a large increase in the associated pressure drop.

Clearly, the need exists for a low-cost microanemometer-based fluid flowmeter characterized by a low pressure drop which, at the same time, takes advantage of the extreme sensitivity of the microbridge throughout its full measurement range to produce accurate results. This is especially true with respect to a compact meter for natural gas which can be retrofitted into existing distribution systems. These often have tight quarters with interfering pipe fittings such as proximate elbows, couplings, reducers and the like.

SUMMARY OF THE INVENTION

The present invention overcomes disadvantages associated with previous hot film or hot element microanemometer packages for gaseous fluid flow sensing. The invention provides a compact, simple, low cost microanemometer gas flow meter package which retains the maximum sensitivity of the microbridge sensor, minimizes turbulence noise effects, avoids clogging and provides a low pressure drop in relation to the achieved sensitivity to flow. Its compactness further distinguishes it from prior bulky, mechanical bellows or diaphragm-based measurement devices. The system is not affected by proximate obstacles or pipe fittings such as elbows upstream or downstream of the flow meter in the gas distribution network as an isolation system prevents the effects from reaching through to the location of the microbridge sensor. The electronics design provides for a repeatable, low noise operation and the design of the support structure allows for low cost manufacturing and integration with, for example, a shut-off valve and regulator, if desired. The system is well suited for the precise measurement of gas flows including the metering of fuel gases, natural, city, propane, butane, or the like.

The system features a combination of a plurality of sequentially encountered particulate trap systems, coarse screen and a laminarizing or flow straightening structure upstream of the sensors to reduce the turbulent effects and allow the use of an unprotected dynamic or flow measuring microbridge sensor. The dynamic microbridge sensor is used in combination with a recessed or remotely mounted static microbridge sensor utilized to make certain static measurements which can be combined with the dynamic measurements to produce accurate mass or standard volumetric flow readings which are valid and fully compensated against density and composition changes in the fluid over a wide range of these fluid parameters.

One successful embodiment includes a plurality of features which combine to produce an unique advantageous metering performance at low manufacturing cost. The system features convenient inlet and outlet pipe fittings for each retrofit or original installation. The inlet of the device features a "deadend trap" which functions not only to trap large particles but also to prevent upstream disturbances from reaching the microbridge sensor. The dead-end trap is in the form of a blind conduit having a closed end and a plurality of radial outlet openings spaced from the closed end connect with a plurality of settling traps. A coarse screen having approximately ten to twenty mesh per inch is located beyond the settling traps together with a laminarizing honeycomb just upstream of an exposed microbridge flow sensor. The honeycomb is generally about 0.5–2.0 inches in length and has a cell size of about 0.125 inches (3.5 mm) and a wall thickness of 0.001–0.002 inches (20–50 microns). The honeycomb functions to reduce turbulence and further reduce the effect of proximate upstream pipe fittings.

The flow sensing microbridge is normally located near the entry to a channel section having a reduced cross-section to achieve the desired flow speed, laminarity and uniformity in the vicinity of the sensing microbridge. With respect to the flow channel, the surface of the flow measuring microbridge may be mounted to be flush with the wall, but preferably protrudes into the flow channel as much as about 1 mm in order to emerge from the boundary layer. An additional microbridge static specific condition sensor which may determine gravity or composition is remotely located and separated from the main flow channel by a short access channel and a protecting screen. The static or condition sensing microbridge sensor may be positioned in any manner with respect to the dynamic microbridge sensor in the device so long as the temperature of the sensed fluid is the same or substantially the same as that flowing past the dynamic sensor.

The entire assembly is packaged together in a compact arrangement sealed in a gas-tight fashion. The only difference between the mounting of the flow and composition sensors, of course, is based on the exposure to the flowing stream. The components can be packaged together in an arrangement such that the gas inlet and outlets are vertical, horizontal or mixed while providing for the appropriate pipe connections.

BRIEF DESCRIPTION OF THE DRAWINGS

In the drawings, in which like numerals are utilized to designate like parts throughout the same:

FIGS. 3a, 3b and 3c illustrate a two sensor package which can be used with an embodiment of the invention in which both sensors are mounted on the same side and location in the flow channel.

DETAILED DESCRIPTION

Figure 1:
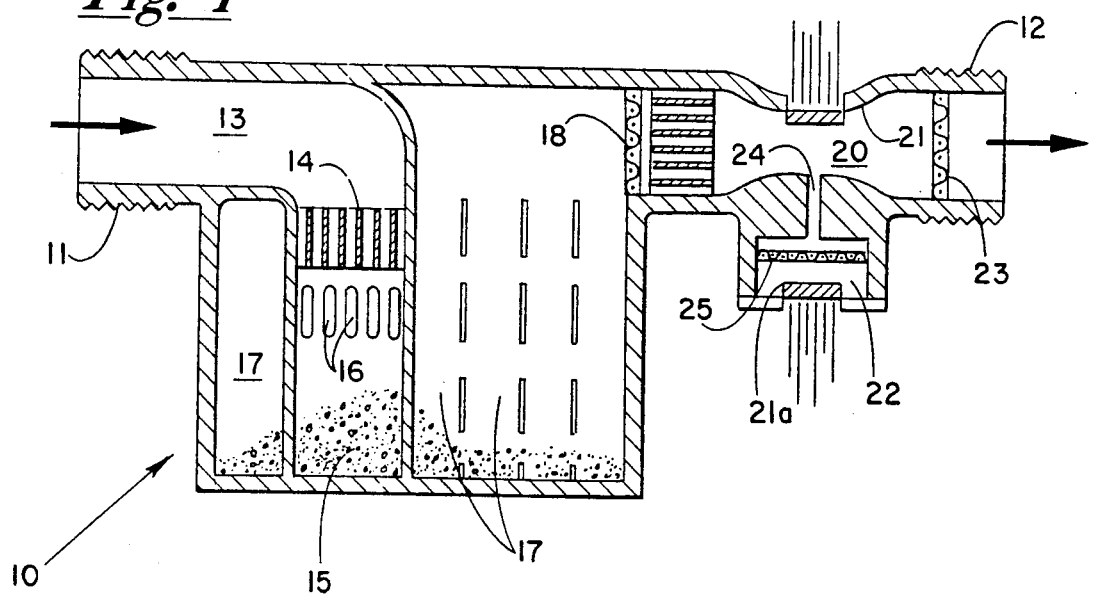
FIG. 1 is a schematic view of the compact flow measurement system of the invention.

FIG. 1 depicts a simple schematic view of a compact flow meter in accordance with the principles of the present invention. The system is shown generally at 10 and includes a main body between an inlet and outlet 12. Inlet conduit 13 may be provided with an optional laminarizing honeycomb 14 and further has a closed end 15 which provides a dead-end trap for particles. The fluid passage is through a plurality of radial openings 16 located well above the closed end of the conduit. The fluid path downstream of openings 16 include a second series of particle traps in the form of the settling traps 17. A coarse screen member 18, typically a screen of ten to twenty mesh, is positioned upstream of and protects a honeycomb 19 which further laminarizes the flow and directs it into nozzle 20, i.e., a channel of a reduced diameter which contains a dynamic flow sensor system 21 and a static composition sensor system 21a. A further coarse screen 23 is provided downstream of the sensors to protect them from the effects of any reverse flow.

The second honeycomb 14 located upstream of the dead-end trap is an optional honeycomb which can be used to provide additional protection against upstream turbulence and make the dead-end trap more effective. The composition sensing microsensor 21a is exposed to the dead-ended or static chamber 22 separated from the main flow channel 20 by a narrow access passage 24. More detailed illustrations of a possible construction of the microanemometer packages or supports are depicted in FIG. 2 and FIGS. 3a–3c.

Figure 2:
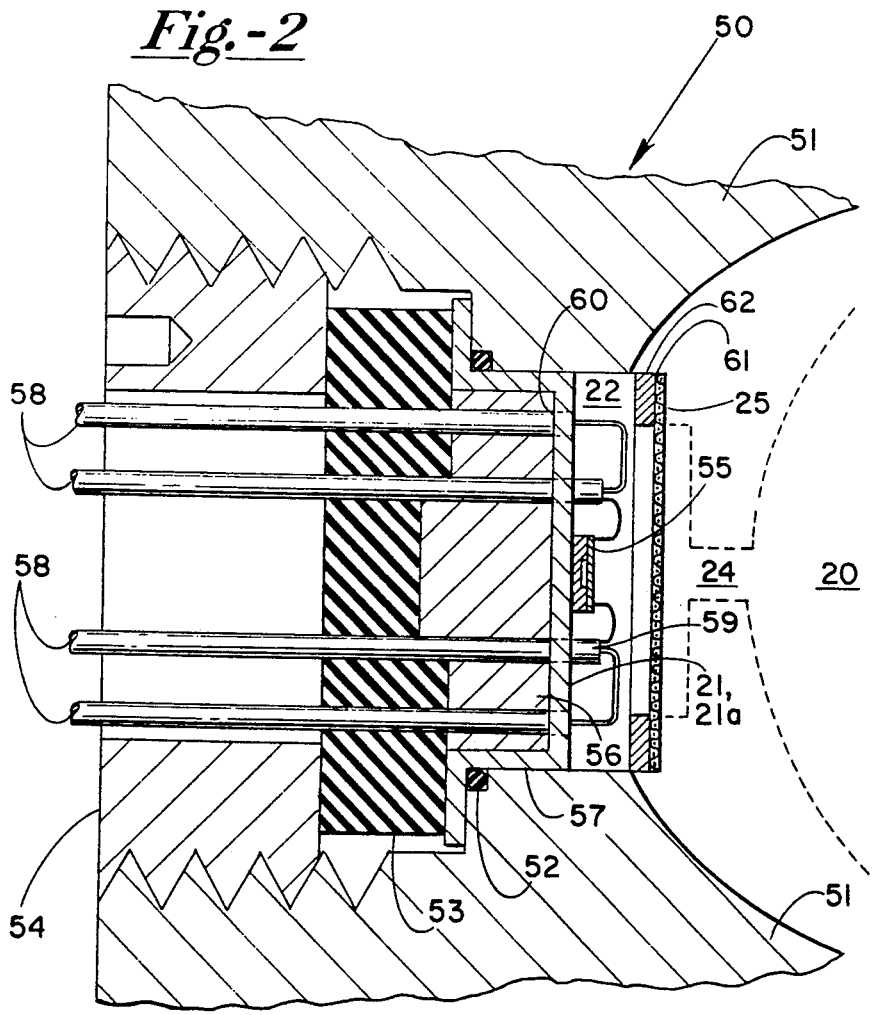
FIG. 2 is a greatly enlarged fragmentary cross-sectional view of a gas-tight microbridge sensor package illustrating both dynamic and static i.e., in-channel and remote location mounting.

In FIG. 2, the greatly enlarged fragmentary structure 50 includes a portion of the main meter body at 51 properly hollowed to accommodate a sensor package 21 or 21a. The sensor package is sealed in gas-tight relation to the meter body by means of O-ring 52, washer 53 and hollow cylindrical set screw or nut 54. The sensor package further contains a microbridge anemometer sensor element 55 contained on a mounting base 56 with a mounting flange 57, and a plurality of electrical leads as at 58 which may protrude into the fluid as at 59 or be mounted flush with the surface as at 60 connect the microbridge chip with external devices, as desired. The package design provides both a gas-tight seal and one which will protect the system at elevated temperatures. The same construction can be used for both the remotely located composition sensor and the flow sensor. As shown, the O-ring seals the header 56 against the main flowmeter block 51, which may be aluminum, while the screw or hollow nut 54 provides either for metal-to-metal seal or using gasket or washer 53 completes the seal between the header lip and the block 51.

As can be seen in FIG. 2, the only difference between the packages for the flow and the composition sensor is based on the space in front of the chip. In the case of the flow sensor, the header surface is about flush with the inner pipe wall so that the microbridge chip sticks out into the flow channel by as much as about the chip's thickness. In the case of the composition sensor, the header surface faces the cavity as at 22 which is connected to the flow channel by the narrow passage 24, typically about 1 mm in diameter. A very fine mesh protective screen 25 is held in place inside the cavity 22 as between a ledge 61 and a tight fitting washer 62. This, of course, protects the composition sensor from debris that might enter the narrow channel 24.

FIGS. 3a and 3b further illustrate details of an alternative dual back-to-back microbridge sensor system which can be used in place of the oppositely or otherwise differently disposed sensors illustrated in FIG. 1 and which requires only one access to the flow channel. The sensor system, shown generally at 26, includes housing members 31 and 32 which may be of high impact plastic material or the like. A pair of thin film microbridge sensors 33 and 34, spanning etched semiconductor chip substrates 35 and 36, are respectively spaced by a member 37. The necessary electrical leads are illustrated as by leads 38 and 39 associated with sensor 33 and 40 and 41 associated with sensor 34.

With respect to the thin film microbridge or anemometer sensors such as those depicted by reference numerals 21, 21a, 33 and 34, very small and very accurate microbridge semiconductor chip sensors of the class described in which etched semiconductor microbridges are used as composition or flow sensors are well known and available. Such sensors might include, for example, a pair of thin film sensors flanking a thin film heater. Semiconductor chip sensors of the class described are treated in a more detailed manner in one or more patents including U.S. Pat. No. 4,478,076, 4,478,077, 4,501,144, 4,555,939, 4,651,564 and 4,683,159, all common of assignee with the present invention. To the extent necessary, additional details with respect to the microbridge sensors themselves may be incorporated by reference from these cited documents.

For the purposes of the present application, it should suffice to say that if the dynamic flow sensor 33, for example, comprises a pair of thin film sensors symmetrically flanking a thin film heater, the sensor can be used to sense flow in either direction. That is, of course, provided that the chip assembly positions in the sensor are in the proper positions in the sensor and the proper orientation so that the flow meets the microbridge at a right angle in the assembled meter. This further allows the flowmeter system of the present invention to be constructed as reversible with respect to the conduit system should such a configuration be desired. In any event, the system is reversible with respect to the mode of measurement of the microbridge system itself. Thus, for sensing dynamic flow, the sensor 21 or 33 is directly exposed to the stream of fluid flowing past it in the conduit. By designing in adequate upstream particulate matter and turbulent flow protection, the full sensitivity of the microbridge system may be directly utilized in this manner. Thus, with the particulate trapping system together with the screen and honeycomb, very accurate flow measurements are made available to the metering or instrument system with little danger for damage to the sensitive microbridge unit itself.

The second microanemometer sensor 21a or 34, which may be mounted away from or back-to-back with sensor 21, or 33 enables other parameters of the fluid to be measured simultaneously with dynamic flow. While the sensor 34 is not directly exposed to the flowing fluid, it is in communication with that fluid and can measure certain parameters related to the composition of the fluid which require a static environment. Such a sensor can be used for the direct measurement of thermal conductivity, k, and specific heat, $c_p$, and from them can determine the density, $\rho$, in accordance with a technique which allows the accurate determination of both properties in a sample of interest using a single sensing system.

That technique contemplates generating an energy or temperature pulse in one or more heater elements disposed in and closely coupled to the fluid medium of interest. Characteristic values of k and $c_p$ of the fluid of interest then cause corresponding changes in the time variable temperature response of the heater to the pulse. Under relatively static conditions of the fluid, this, in turn, induces corresponding changes in the time variable response of one or more temperature responsive sensors coupled to the heater principally via the fluid medium of interest.

A method and apparatus for determining both the thermal conductivity, k, and the specific heat, $c_p$, of a fluid of interest are more fully disclosed in detail in U.S. Pat. No. 4,944,035. The use of the thermal conductivity, k, and specific heat, $c_p$, of a fluid of interest to determine the density or specific gravity, $\rho$, of that fluid of interest is also possible as a function of specific heat and thermal conductivity. A method and system for accomplishing this is more fully illustrated and described in U.S. Pat. No. 4,956,793. This, of course, allows one to monitor generally the composition of the gaseous fluid of interest based, for example, on known hydrocarbon constituents. The two references cited next above also are assigned to the same assignee as the present invention and to the extent necessary, details from them are deemed incorporated by reference in the present application.

More particularly with respect to the thrust of the present invention, however, the measurement of dynamic flow of the fluid in the system is greatly enhanced by the provision of a substantially laminar flow profile, i.e., one in which the Reynolds number, $n_{Re}$, is $\leq 2000$ based either on the passage diameter or on the distance to the leading edge of the sensor chip, past the microanemometer device or based on the laminar flow pattern provided by the nozzle itself. In addition to the elimination of turbulent flow at the point of measurement, the system of the present invention has substantially eliminated the probability of damage to the microanemometer due to the presence of particles in the flowing fluid. In accordance with the combination screen and trapping system of the present invention, it has been shown in recent modeling work that less than 2% of particles of a size 300 microns or greater escape the dead-end trap device 15 even under extreme flow rate conditions of one-third greater than the maximum design flow rate for the meter. The openings 16 are normally of sufficient collective size to be equal to or greater than the cross-section of the ID of pipe 13 and spaced highe nough above the bottom of the dead-end trap to contain the expected amount of particles, normally several diameters. It has further been experimentally determined that the settling traps retain up to 99% of particulate matter sized 300 microns or larger, which escape the dead-end trap. The combination factors out to a total fraction of only about 0.0002 of entering particular of 300 microns or greater are transmitted through both traps. Of course, the fraction is smaller for larger particles and somewhat larger for smaller particles. The size 300 microns is singled out and used because in earlier experiments, without the traps, large quantities of 0–100, 100–200 and 200–300 micron-sized particles, when caused to impact the microbridge sensors of the class used, did not harm the microbridge sensors themselves, while particles in a class 300–400 microns in size did cause damage to such a sensor.

The overall pressure drop of the systme of FIG. 1 has been measured and found to be less than that of an earlier experimental embodiment which did not use traps and honeycombs but which instead used a total of five 30–40 mesh screens to achieve a similar reduction in transmitted particular matter.

Of course, the schematic diagram of FIG. 1 is intended to show the internal portion of a meter housing such as a gas meter housing which would include in an overall structure, an associated shut-off valve and regulator. However, the principles and operation of the system can be adequately explained on the basis of the drawing FIG. 1. The gas thus enters the system through 13, flows through the holes 16, across and around the further traps 17 and past the coarse screen 18, through honeycomb 19 and into the nozzle-shaped section of the flow channel 20. The gas flows through the channel 20 and out the upper right connection after passing through the second flow screen 23.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different equipment and devices and that various modifications both as to equipment and procedure details can be accomplished without departing from the scope of the invention itself.

What is claimed is:

1. A compact hot film microanemometer-based flow meter for a gaseous fluid of interest comprising:
   inlet and outlet access for connecting the flow meter to a distribution system for the gaseous fluid;
   generally hollow meter body means connected between the inlet and outlet accesses and describing an internal fluid flow path;
   a reduced diameter nozzle-shaped measuring section describing a segment of the fluid flow path channel in the meter body having at least one microbridge sensor located therein and being in communication with the fluid;
   a particular trapping system including trap means having the form of a fluid conduit having a closed end and a plurality of outlet openings in said conduit spaced apart from said closed end, said openings in fluid communication with a plurality of sequentially disposed settling chambers, all disposed in the fluid flow path between the inlet means and the measuring section containing the microbridge sensor; and
   at least a first laminarizing means disposed in the stream between the particulate trapping system and the measuring section.

2. The flow meter of claim 1 further comprising a coarse screen means disposed between the particulate trapping system and the first laminarizing means.

3. The flow meter of claim 1 further comprising second laminarizing means disposed upstream of the particular trapping system.

4. The flow meter of claim 3 wherein the first and second laminarizing means are honeycomb structures.

5. The flow meter of claim 1 wherein the measuring section contains at least two sensors, a dynamic flow measuring microbridge sensor and a static condition measuring microbridge sensor being disposed on opposite sides of the main fluid passage.

6. The flow meter of claim 1 wherein the measuring section contains at least two sensors, a dynamic flow measuring microbridge sensor and a static condition measuring microbridge sensor both being contained in one package mounted on one side of the flow conduit.

7. The flow meter of claim 1 wherein the first laminarizing means is an elongated honeycomb structure.

8. The flow meter of claim 1 wherein the microanemometer sensors further comprise a plurality o f electrically conductive leads disposed to connect outside the meter body.

9. The flow meter of claim 8 wherein the electrically conductive leads do not protrude into the gaseous fluid of interest.

10. A compact hot film microanemometer-based flow meter for a gaseous fluid of interest comprising:
    inlet and outlet access for connecting the flow meter to a distribution system for the gaseous fluid;
    generally hollow meter body means connected between the inlet and outlet accesses and describing an internal fluid flow path;
    a reduced diameter nozzle-shaped measuring section describing a segment of the fluid flow path channel in the meter body;
    a dynamic hot film icrobridge sensor disposed in the nozzle-shaped measuring section and directly exposed to the main fluid flow stream;
    a condition measuring static hot film microbridge sensor positioned in communication with the main flow stream but not in direct contact with the main flow stream and at a position relative to the dynamic sensor such that the temperature of the fluid of interest encountered by both sensors is substantially the same;
    a particulate trapping system including a plurality of sequentially encountered particulate trap means disposed in the fluid flow path between the inelt means and the measuring section containing the first and second microbridge sensor means; and
    at least a first laminarizing means disposed in the stream between the particulate trapping system and the measuring section, said particular trap means has a dead-end trap in the form of a fluid conduit having a closed end and a plurality of radially disposed outlet openings spaced from the closed end which communicate with a plurality of sequentially disposed settling traps.

11. The flow meter of claim 10 wherein the area of the total radial outlet openings spaced from the closed end is at least equal to the internal cross-section of the fluid flow conduit.

12. In a compact hot film microbridge-based flow meter for a gaseous fluid of interest comprising inlet and outlet accesses for connecting the flow meter to a distribution system for the gaseous fluid of interest, a generally hollow meter body means connected between the inlet and outlet accesses and describing an internal fluid flow path having a nozzle-shaped necked down measuring channel therein, a first hot film microbridge flow sensor associated with the flow meter and disposed in the measuring channel so as to be directly exposed to the mainf luid flow stream and a second hot film microbridge sensor associated with the flow meter disposed so as to be in communication with the main flow stream but not in direct contact with the mani flow stream, the improvement comprising:
    a particulate trapping system having a fluid conduit as a first element thereof for communicating said fluid to a dead end, having openings in said conduit spaced apart from said dead end, said openings being in fluid communication with a plurality of sequentially encountered particulate trap settling chambers, all disposed in the fluid path between the inlet means and the measuring channel; and
    at least a first laminarizing means disposed in the stram between the particular trapping system and the measuring channel.

13. The flow meter of claim 12 further comprising a coarse screen means disposed between the particulate trapping system and the laminarizing or flow straightening structure.

14. The flow meter of claim 12 further comprising second laminarizing means disposed upstream of the particulate trapping system.

15. The flow meter of claim 12 wherein the first laminarizing means is an elongated honeycomb structure.

* * * * *